United States Patent [19]
Kaplan et al.

[11] Patent Number: 5,414,712
[45] Date of Patent: May 9, 1995

[54] METHOD FOR TRANSMITTING DATA USING A COMMUNICATION INTERFACE BOX

[75] Inventors: Eric B. Kaplan, Wheaton; Arthur G. Kuehn, Mount Prospect, both of Ill.

[73] Assignee: Progressive Computing, Inc., Oak Brook, Ill.

[21] Appl. No.: 734,584

[22] Filed: Jul. 23, 1991

[51] Int. Cl.⁶ .............................................. G06F 11/00
[52] U.S. Cl. .................................... 371/15.1; 371/29.1
[58] Field of Search ................... 371/15.1, 29.1, 16.1, 371/17, 22.1, 16.4, 29.5, 20.1; 324/73.1

[56] References Cited

U.S. PATENT DOCUMENTS

| | | | |
|---|---|---|---|
| 3,575,589 | 4/1971 | Neema et al. | 235/153 |
| 3,711,691 | 1/1973 | Breitenbach et al. | 235/153 |
| 3,931,506 | 1/1976 | Borrelli et al. | 235/153 |
| 3,939,453 | 2/1976 | Schroeder | 340/172 |
| 4,012,625 | 3/1977 | Bowen et al. | 235/153 |
| 4,135,662 | 1/1979 | Divigos | 235/304 |
| 4,168,527 | 9/1979 | Winkler | 364/580 |
| 4,168,796 | 9/1979 | Fulks et al. | 235/302 |
| 4,174,805 | 11/1979 | Fulks et al. | 235/302 |
| 4,348,760 | 9/1982 | Rice et al. | 371/20 |
| 4,354,268 | 10/1982 | Michel et al. | 371/20 |
| 4,424,576 | 1/1984 | Lange et al. | 364/900 |
| 4,433,413 | 2/1984 | Fasang | 371/25 |
| 4,434,489 | 2/1984 | Blyth | 371/29 |
| 4,488,299 | 12/1984 | Fellhauer et al. | 371/20 |
| 4,489,414 | 12/1984 | Titherley | 371/20 |
| 4,499,581 | 2/1985 | Miazga et al. | 371/20 |
| 4,517,512 | 5/1985 | Petrich et al. | 324/73 R |
| 4,551,837 | 11/1985 | Goegelein et al. | 371/25 |
| 4,567,592 | 1/1976 | Minicilli | 371/20 |
| 4,608,531 | 8/1986 | Stephens | 324/73 |
| 4,691,316 | 9/1987 | Phillips | 371/20 |
| 4,707,834 | 11/1987 | Frisch et al. | 371/20 |
| 4,707,848 | 11/1987 | Durston et al. | 379/1 |
| 4,713,815 | 12/1987 | Bryan et al. | 371/29 |
| 4,718,064 | 1/1988 | Edwards et al. | 371/20 |
| 4,724,378 | 2/1988 | Murray et al. | 324/73 |
| 4,736,374 | 4/1988 | Kump et al. | 371/20 |
| 4,760,330 | 7/1988 | Lias, Jr. | 324/73 R |
| 4,794,599 | 12/1988 | Purcell et al. | 371/20 |
| 4,810,958 | 3/1989 | Mogi et al. | 324/73 R |
| 4,837,764 | 6/1989 | Russello | 371/20 |
| 4,964,124 | 10/1990 | Burnett | 371/15.1 |

OTHER PUBLICATIONS

IBM Technical Disclosure Bulletin "Microprocessor-Controlled cable Tester" vol. 23, No. 3, 1980, pp. 972–975.

*Primary Examiner*—Robert W. Beausoliel, Jr.
*Assistant Examiner*—Phung Chung
*Attorney, Agent, or Firm*—Dean A. Monco

[57] ABSTRACT

A Communication Interface Box (CIB) enables bidirectional synchronous/asynchronous data transfer between external devices including data terminal equipment (DTE) and data communication equipment (DCE) and a personal computer by way of the parallel port of the personal computer. The CIB provides one or more input/output ports from the DCE and DTE for receiving or transmitting serial data. A bidirectional universal synchronous/asynchronous transmitter/receiver USART and a control circuit are used to transfer control and data signals between external devices and a personal computer for serial data analysis. The CIB eliminates the need for equipment dedicated solely to serial data analysis as well as the need to add hardware boards to personal computers to perform serial data analysis. The CIB allows for serial data analysis by way of the parallel port of a personal computer.

3 Claims, 16 Drawing Sheets

METHOD FOR TRANSMITTING DATA USING A COMMUNICATION INTERFACE BOX

FIELD OF THE INVENTION

This invention relates to serial data analysis and more particularly to a serial data analyzer which interfaces with the parallel port of a personal computer or other computer for both monitoring the transfer of data and signals between external devices or the state of a single external device or emulating functions of external devices.

DESCRIPTION OF THE PRIOR ART

Serial data analyzers have been well known in the art for decades. Initially, serial data analyzers were custom built units dedicated solely to the function of serial data analysis. Specifically, serial data analysis can include the monitoring of data signals of a single external device or the communication between two external devices to evaluate the status of a device or determine whether a device is functioning properly. Such external devices can include anything from industrial test equipment to a computer, a modem or other peripheral equipment.

Because of the prohibitive costs of such custom units, eventually personal computers were adapted to allow serial data analysis. Specifically, add-in hardware boards and special software used with a personal computer could provide the equivalent functions of the early serial data analyzers. The advantage of such personal computer-based serial data analyzers was that they provided greater functionality and a lower cost. In addition, the personal computer used for serial data analysis could also be used in traditional applications such as word processing or spread sheet applications.

One problem associated with modifying a personal computer for serial data analysis stems from the need to enter the personal computer to insert a hardware board. This problem is particularly significant for lap top computers and the new "notebook" computers whose bus connectors may not be easily accessible.

Another problem associated with using a personal computer for serial data analysis is the lack of mobility of a particular personal computer which has been adapted for serial data analysis.

An object of the invention is to enable the bidirectional synchronous/asynchronous transfer of data between external devices and a personal computer by way of the parallel port.

Another object of the invention is to provide serial data analysis of data received from the external devices in either a monitor mode or an emulation mode.

Another object of this invention to obviate the need to install additional hardware boards in personal computers to allow for serial data analysis.

A further object of this invention is to allow serial data analysis via the parallel port of a lap top or personal computer which may not otherwise be adaptable for serial data analysis.

SUMMARY OF THE INVENTION

The present invention comprises a serial data analyzer adjunct in the form of a communication interface box (CIB) which provides for the analysis of data between external devices including data terminal equipment (DTE) and data communication equipment (DCE) and a personal computer by way of the parallel port of the personal computer. Specifically, the CIB interfaces with the personal computer to either monitor data transferred between two external devices or to emulate certain functions of a particular DTE or DCE to evaluate the status of one of the devices or determine whether it is functioning properly. The CIB can be adapted to transfer data of different types, such as RS-232 data or RS-422 data, Integrated Service Digital Network (ISDN), or any other serial data. An example of monitoring would include monitoring the communication between a modem and a personal computer. An example of emulation would include sending signals to a piece of industrial equipment and waiting for a return signal to determine if the equipment is functioning properly.

The CIB provides greater flexibility of which personal computer can be used for serial data analysis. Specifically, the CIB allows any computer with a parallel port to be used for serial data analysis by eliminating the need to insert boards and allowing serial data analysis by computers which are not otherwise adaptable. The CIB provides one or more input/output ports for receiving or transmitting serial data from or to the DCE and DTE. Driver circuits are used for inputting and outputting data. The data is transferred between the driver circuits and external devices by way of a bidirectional universal synchronous/asynchronous receiver/transmitter (USART). A control circuit including registers and programmable array logic devices (PALs) is used to control the transfer of data between the external devices and the parallel port of the personal computer.

BRIEF DESCRIPTION OF THE DRAWINGS

Reference is made to the accompanying drawings wherein.

DESCRIPTION OF THE PREFERRED EMBODIMENTS

Figure 1:
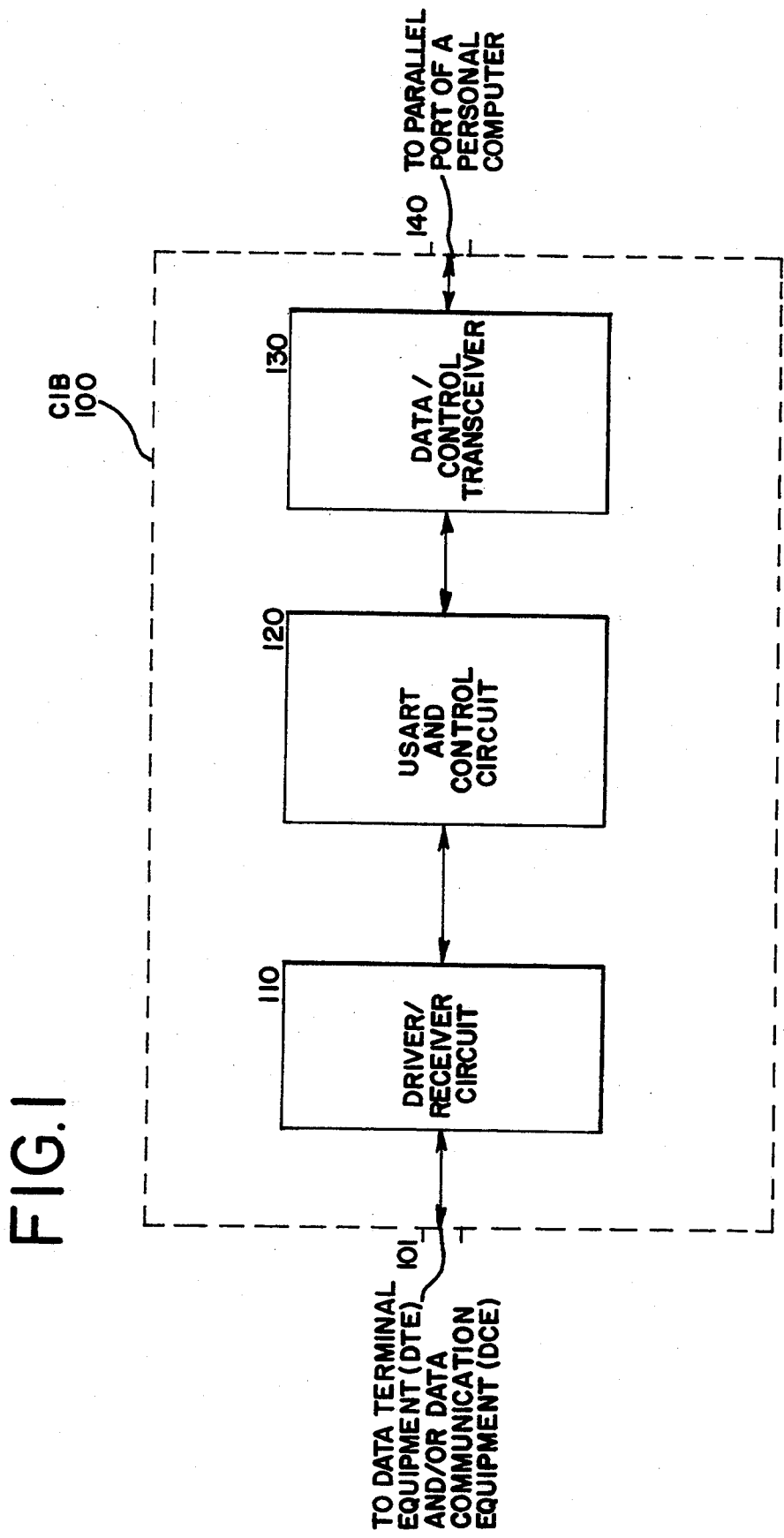
FIG. 1 is a general diagram of the Communication Interface Box according to the present invention.

A Communication Interface Box (CIB) has been configured to exchange data between external devices which provide serial signals and a parallel port of a computer such as a personal computer, although other types of computers could make use of this invention, including but not limited to mini-computers, dedicated computers, or any other type of computer. For illustrative purposes, reference is made herein to a personal computer, with the understanding that others could be used.

The CIB of the preferred embodiment can operate in any one of three modes although other embodiments could operate in a greater number, a lesser number, and/or different modes. The first mode of operation of the preferred embodiment is an emulation mode called the "DTE emulation mode". In the emulation mode, the CIB functions as a DTE. Data is bidirectionally transferred between the computer and data communication equipment (DCE) such as a modem, facsimile board or other data communication equipment. When emulating a function of the DTE, the user can send a signal from the personal computer to the DCE and wait for a return signal to see if the DCE is functioning properly. An example of emulating a DTE function would include transmitting signals from the personal computer and the CIB which is functioning as a DTE to a modem and receiving return signals to determine if the modem is functioning properly.

The second mode is called the "DCE emulation mode." In the DCE emulation mode, the CIB functions as a DCE where data is bidirectionally transferred between the computer and the data terminal equipment (DTE) such as a terminal, a sensor, or other data terminal equipment. An example of emulating a DCE function would include transmitting signals from the CIB to a personal computer to determine if the personal computer is properly receiving the modem signals. The transfer of signals when the CIB is in either the first or second mode is identical. The input signals to the CIB are specific to DCE or DTE devices and thereby determine whether the CIB is operating in the first or second mode.

Finally, the CIB can operate in a third mode called the "monitor mode" where data of either the DTE, the DCE or data transferred between the DCE and the DTE is received by the CIB for serial data processing. For example, the CIB determines whether the parity and framing are correct. After the CIB completes its processing the data is transferred from the CIB to the personal computer by way of the parallel port. The software of the personal computer then analyzes the data. The user can input commands to the CIB via the personal computer to perform any monitoring function. The results of the monitoring, including signals on various lines or errors in transmission, can be displayed on the monitor of the personal computer. An example of monitoring would include any type from monitoring the transfer of information between a modem and a personal computer to monitoring the transfer of signals between two interacting industrial machines.

FIG. 1 shows a general block diagram of a CIB 100 according to the present invention. Signals from either the DTE or DCE, or both, are transmitted or received at the serial input/output (I/O) port 101. If data is being received from the DCE or DTE at I/O port 101, the signals, including data and control signals, are transmitted by driver/receiver circuit 110 to the USART and control circuit 120. The signals are then processed and converted from serial to parallel form in the USART and control circuit 120 before being transmitted to the control/data transceiver 130. The signals are then transmitted by way of a parallel I/O port 140 to the parallel port of the personal computer. The driver/receiver circuit 110, USART and control circuit 120 and the control/data transceiver 130 in FIG. 1 allow for bidirectional transmission of signals. Therefore, the transmission of signals from the personal computer to the DCE or DTE devices is also achieved by the CIB 100.

Figure 2:
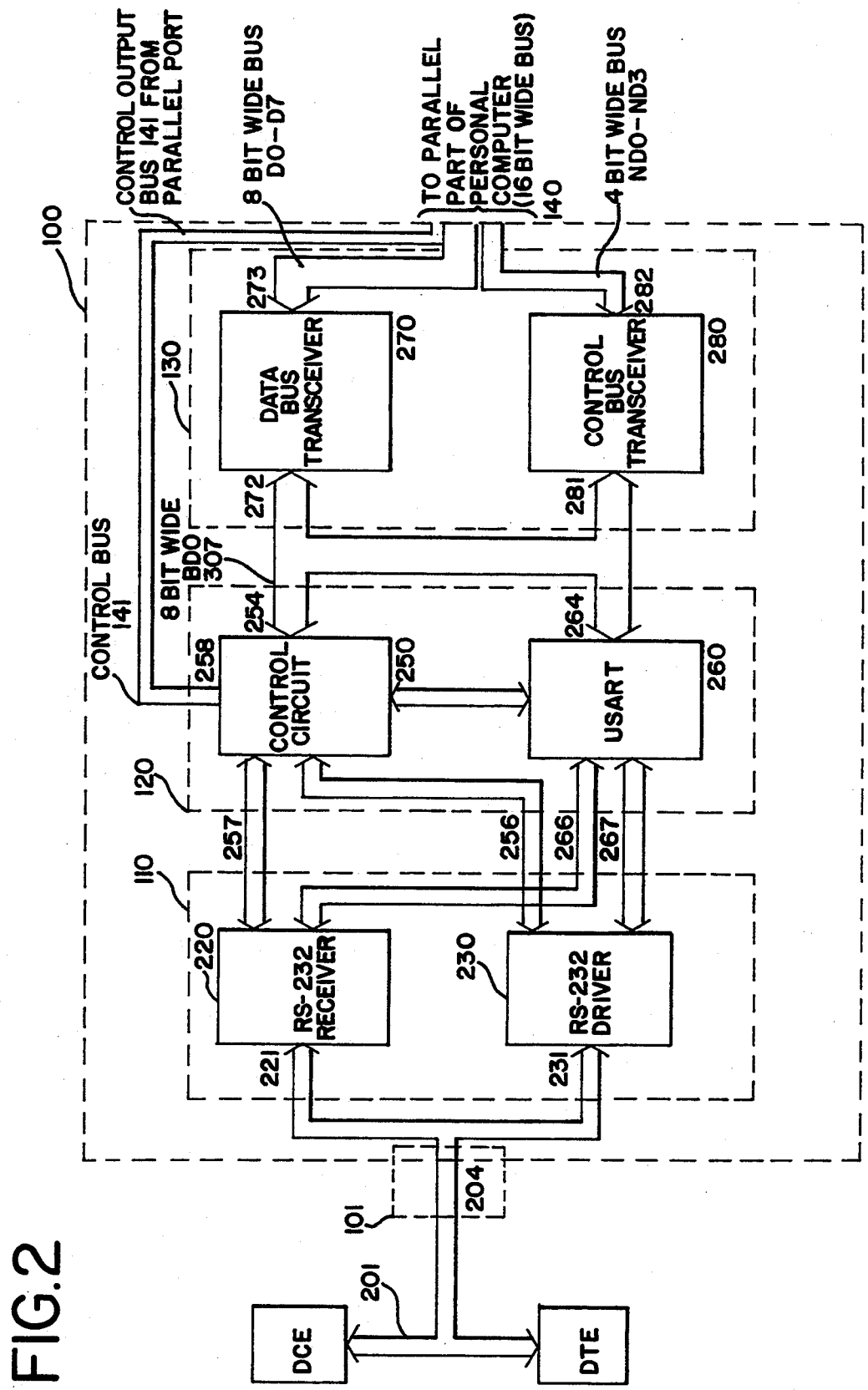
FIG. 2 is a more specific block diagram showing a first embodiment of the Communication Interface Box including a single input port.
Figure 3A:
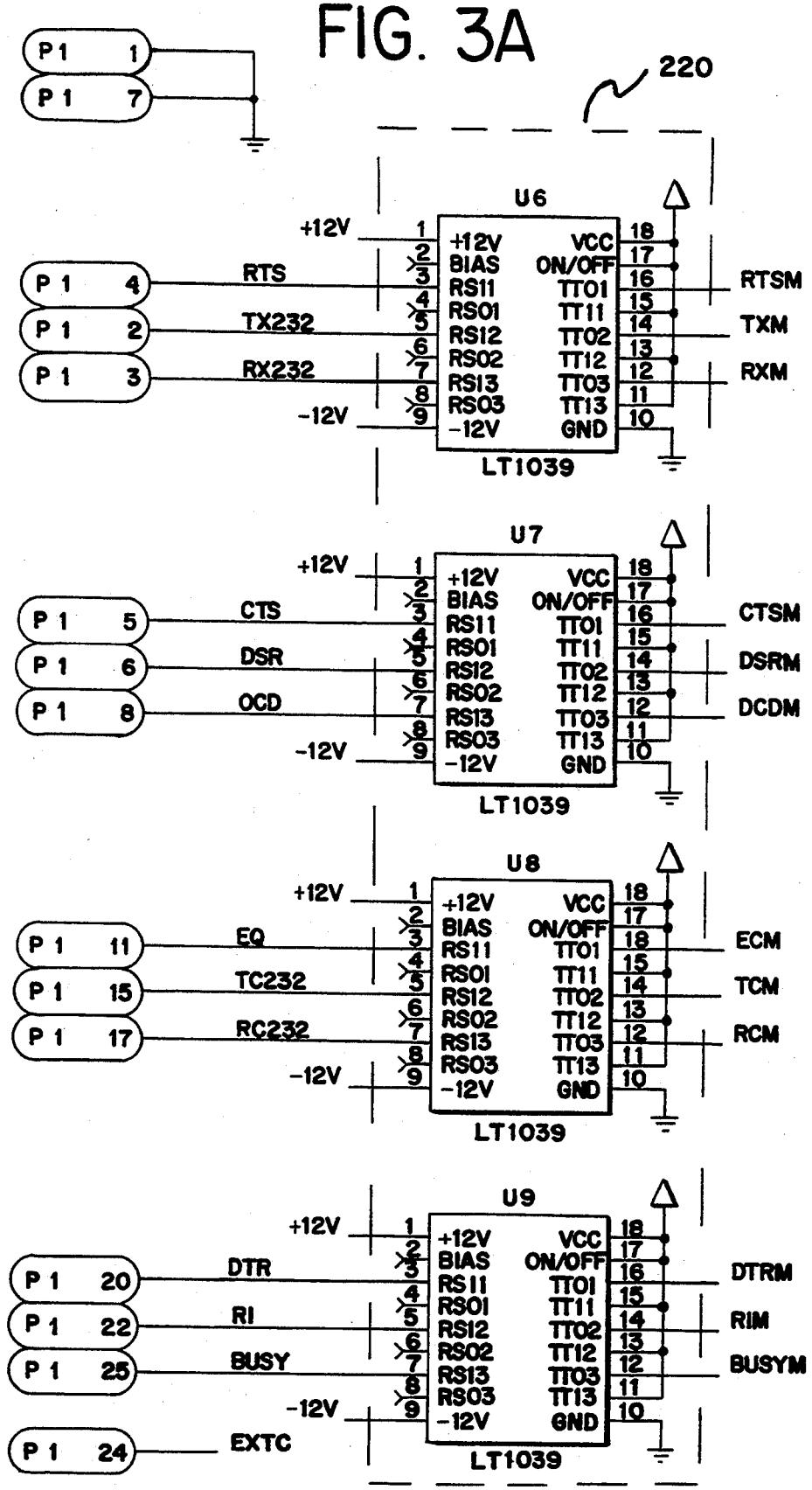
FIG. 3 is a schematic diagram showing the first embodiment of the Communication Interface Box.
Figure 3B:
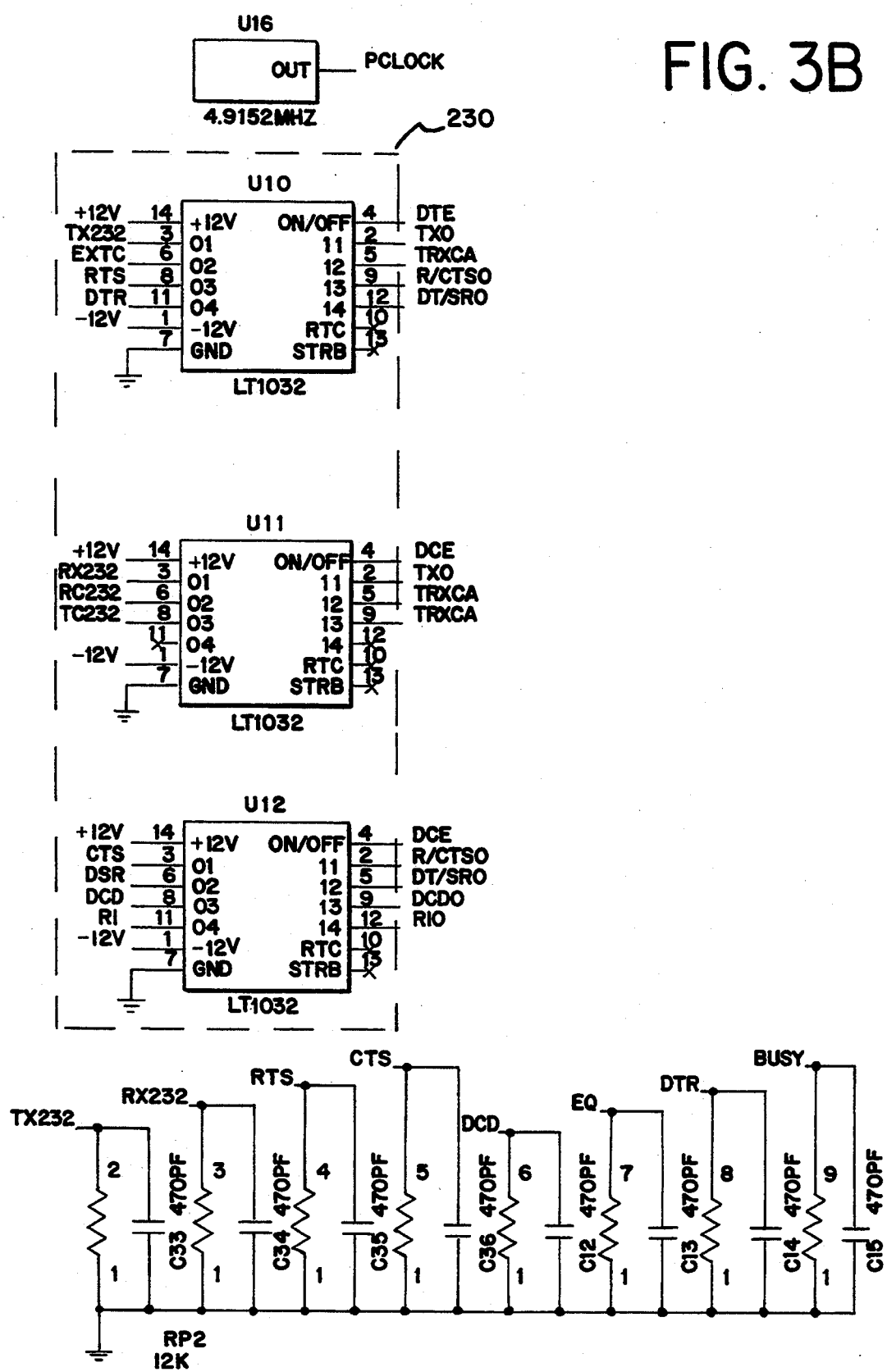
Figure 3C:
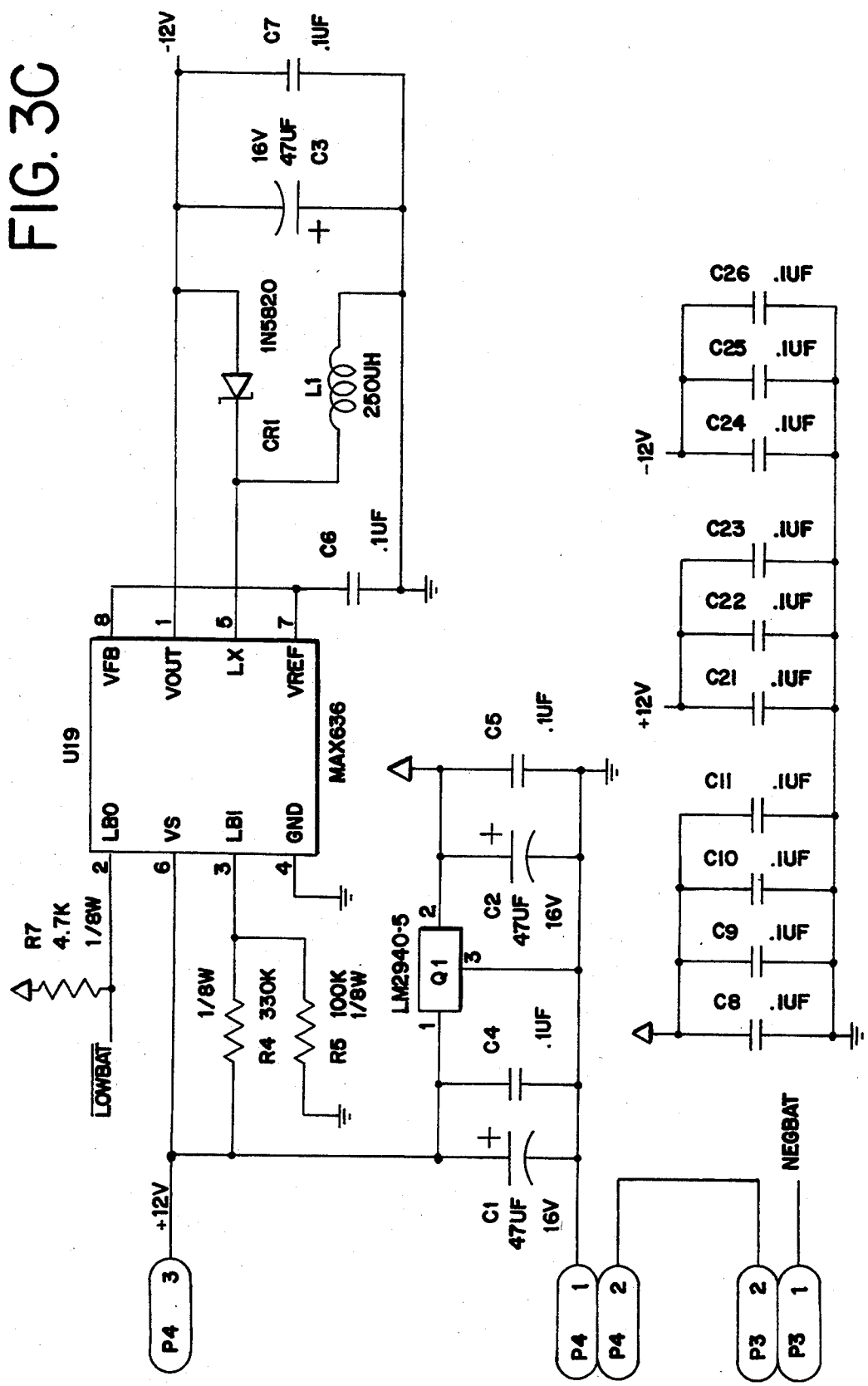
Figure 3D:
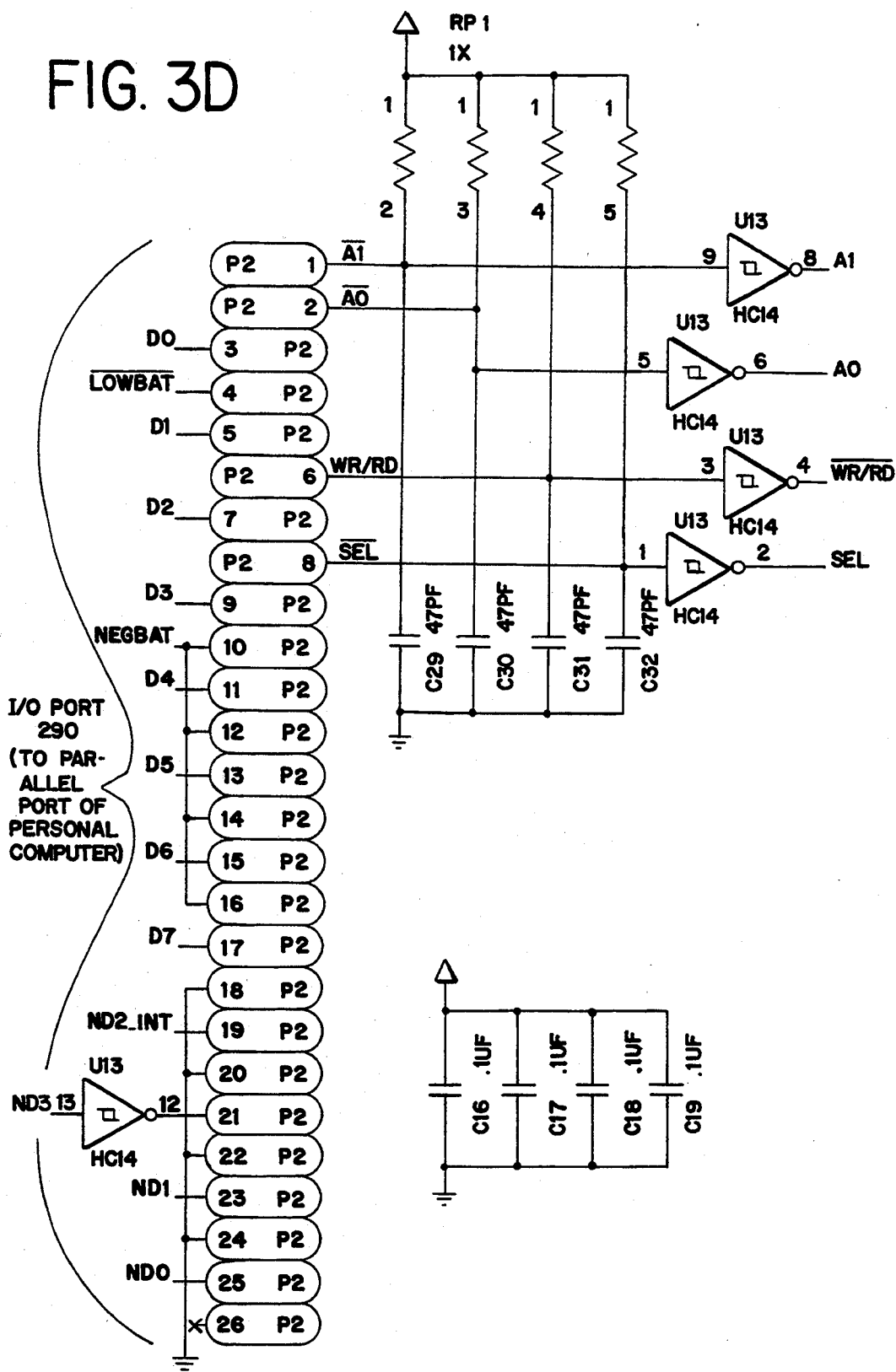
Figure 3E:
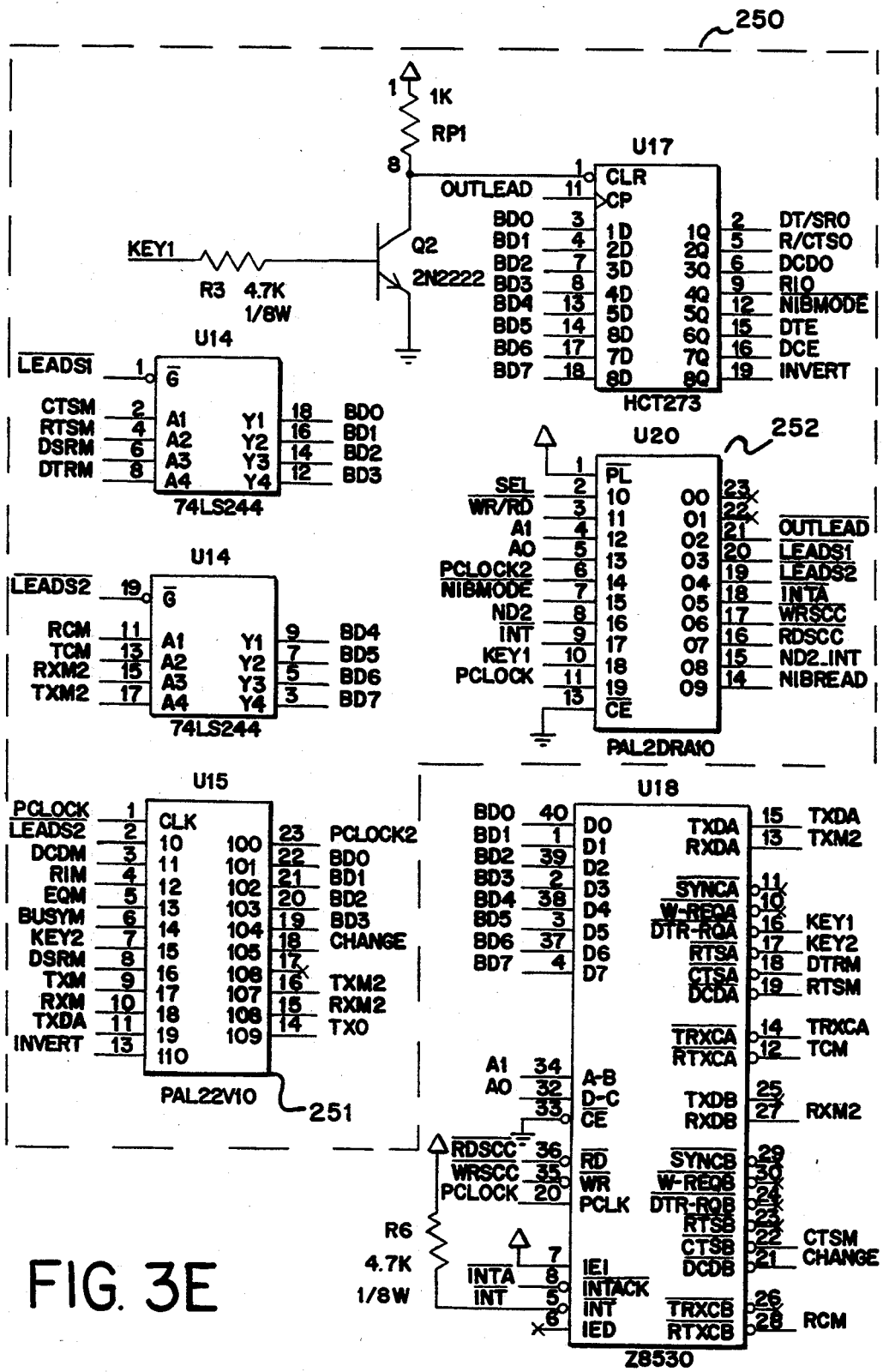
Figure 3F:
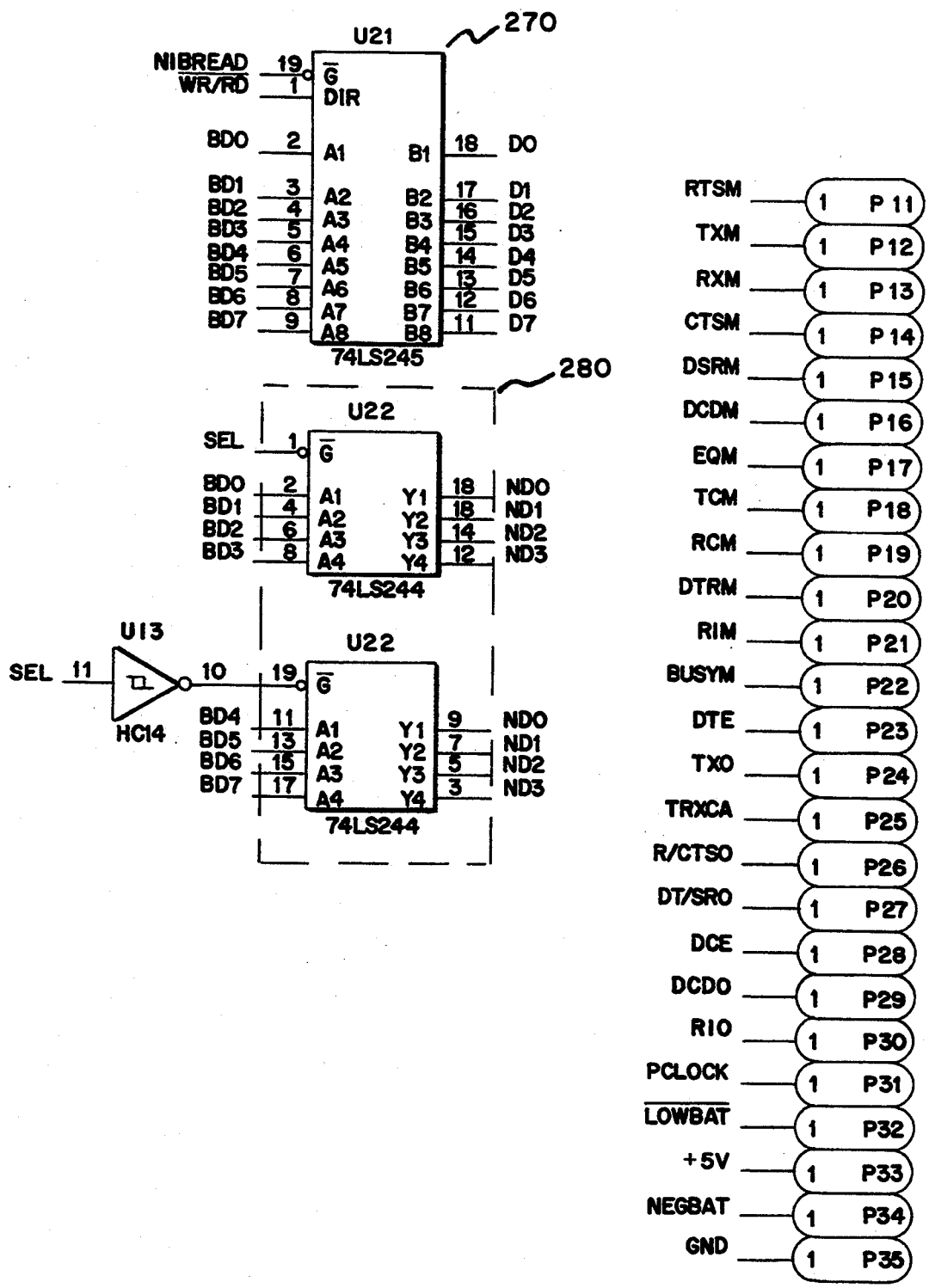

FIGS. 2 and 3 show the CIB 100 in more detail. On the left side, CIB 100 may be coupled to a DCE or a DTE at its input 101. On the right side of CIB 100, output 140 may be connected or coupled to a parallel port of a computer.

The embodiment of FIG. 2 shows a "T" connector 201 linking a DCE and a DTE to input port 101 of CIB 100. In this embodiment, input port 101 comprises a single input 204. Input 204 preferably comprises a 25 pin connector for RS-232 signal analysis.

In the embodiments shown in FIGS. 2 and 3, the driver/receiver circuit 110 has components that are specific to RS-232. This is reflected in FIG. 2, where driver/receiver circuit 110 comprises an RS-232 receiver circuit 220 and an RS-232 driver circuit 230, both being coupled to the RS-232 input 204. If the user is analyzing RS-232 data, a suitable RS-232 driver/receiver could be used. However, the embodiment shown in FIGS. 2 and 3 uses a separate driver circuit 230 and receiver circuit 220 to transmit RS-232 data. While the receiver circuit 220 is always active, the line driver 230 is active only some of the time for selectively transmitting signals. An example of a receiver component would be a LT 1039 RS-232 driver/receiver from Linear Technologies.

USART and control circuit 120 of FIG. 1 comprises a control circuit 250 and a USART 260 shown in FIG. 2. Generally speaking, each of these two components 250 and 260 are connected to components 220 and 230 via lines 256, 257, 266, and 267. The outputs of RS-232 receiver circuit 220 are monitored by the control circuit 250 on lines 257 and by USART 260 at lines 266. Because the USART 260 is a dual channel device, it can monitor both the DTE and the DCE at the same time. When a change in the line is detected, the control circuit 250 exchanges signals with the USART 260 as well as the data bus BD0-BD7 for transfer of signals to the personal computer. These signals can either represent data or status of the DCE or DTE or can be data or commands from the personal computer.

Specifically, the preferred embodiment of control circuit 250 includes two programmable array logic devices (PALs) 251 and 252 shown in FIG. 3. These PALs monitor outputs of the receiver circuit 220 on lines 257 for RS-232 signals. Depending on the mode of operation, the PALs will detect different signals. In monitor mode the PALs 251 and 252 take signals from the receivers 210 and 220 and present them to the bus 254 for eventual transfer to the personal computer via data bus transceiver 270 or control bus 280. In emulation mode the PALs 251 and 252 additionally send signals which emulate a function of the DTE or DCE. The PALs 251 and 252 detect the transmission of signals from the personal computer to a DTE or DCE or the receipt of return signals from a DTE or DCE. The PALs provide both data and control bus signals and signals which allow USART 260 to communicate effectively with various kinds of parallel ports of the computer, such as those which are bidirectional and those which are output only. The status of the DTE or DCE devices or any errors in transmission can be displayed on a monitor. The specific boolean algebra equations for both PALs used in FIGS. 2 and 3 are shown in Appendix 1, in which all input and output signals correspond to the specific inputs and outputs of the components shown in FIG. 3.

Figure 4:
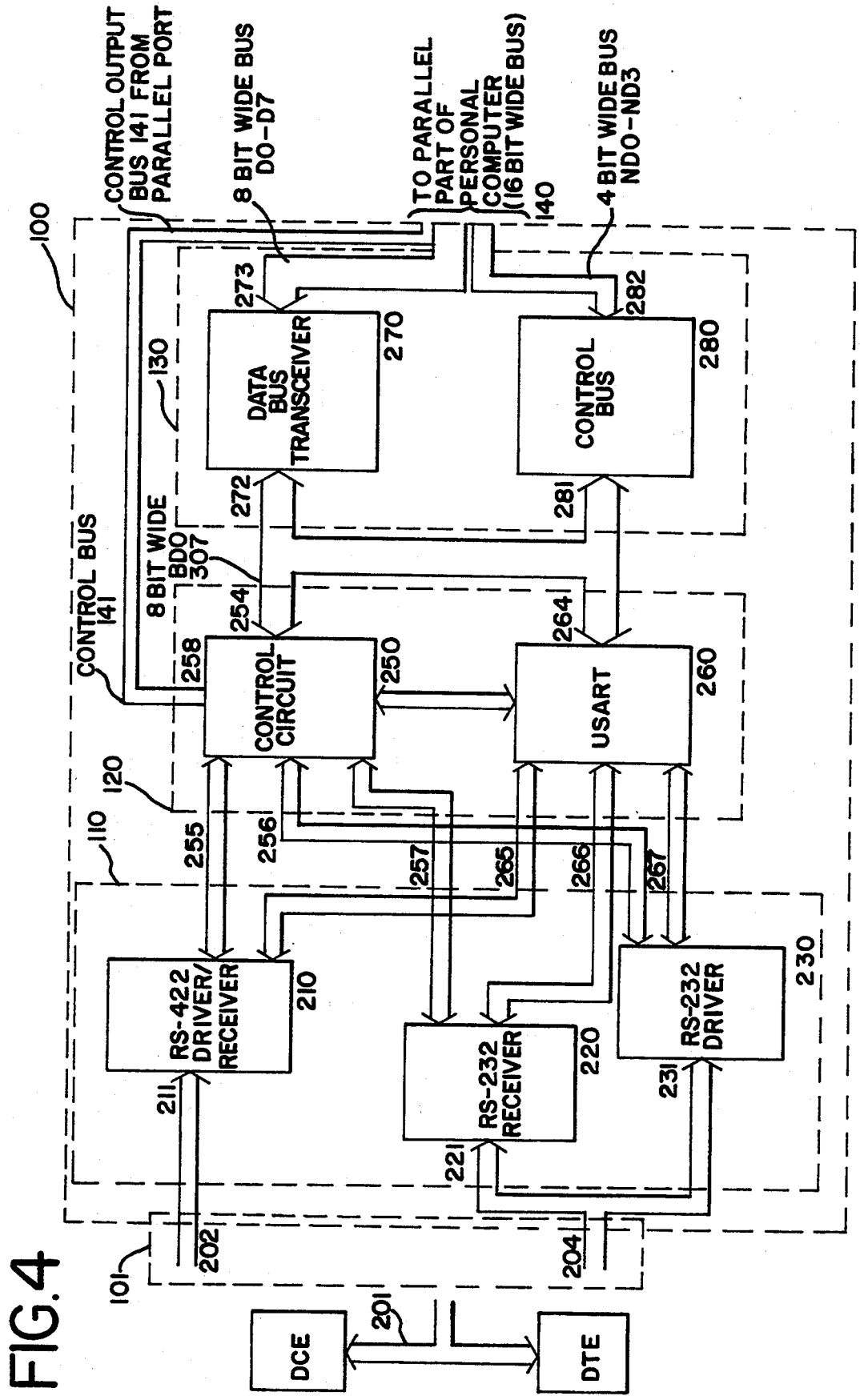
FIG. 4 is a more specific block diagram showing a second embodiment of the Communication Interface Box including two input ports.
Figure 5A:
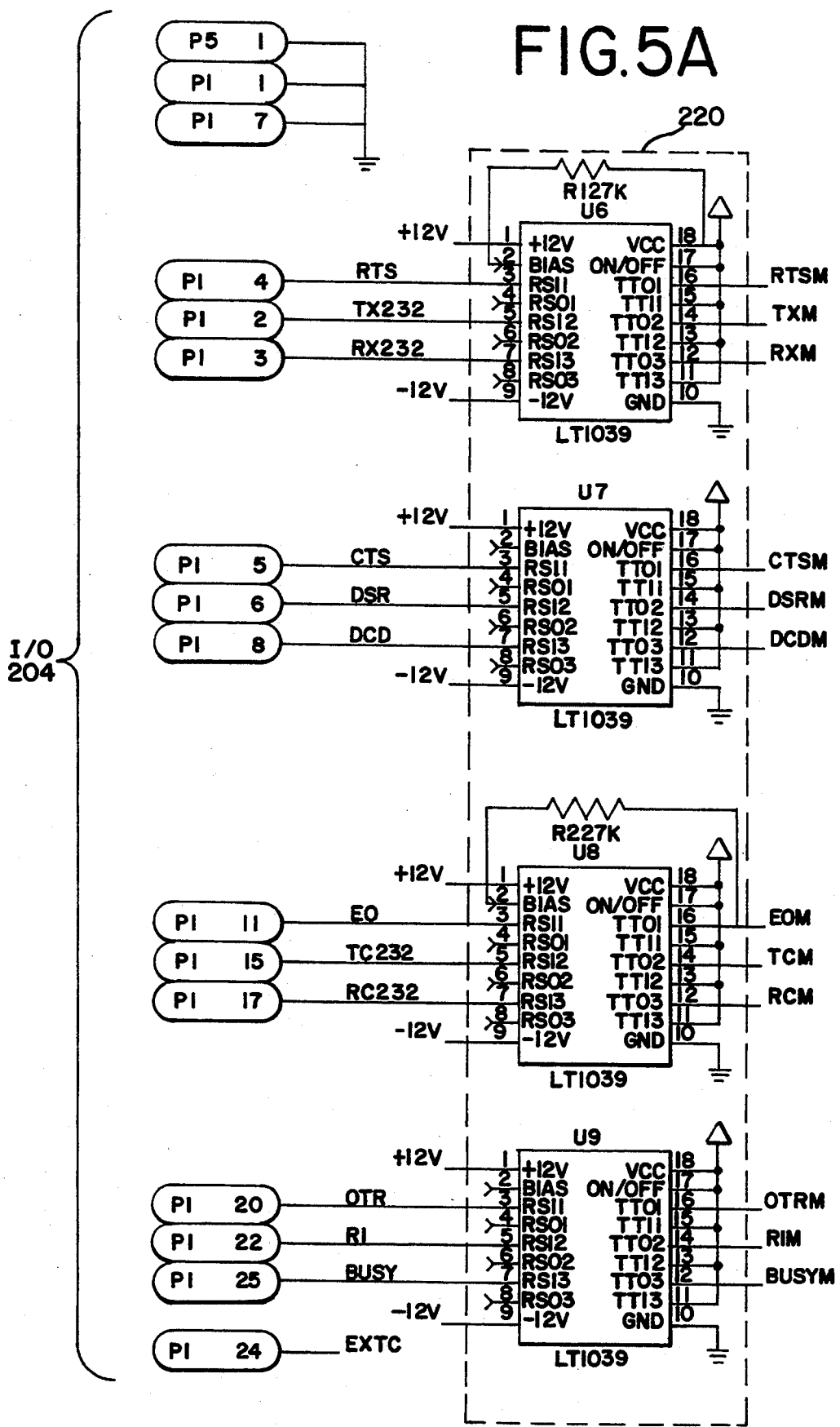
FIG. 5 is a schematic diagram showing the second embodiment of the Communication Interface Box including two input ports.
Figure 5B:
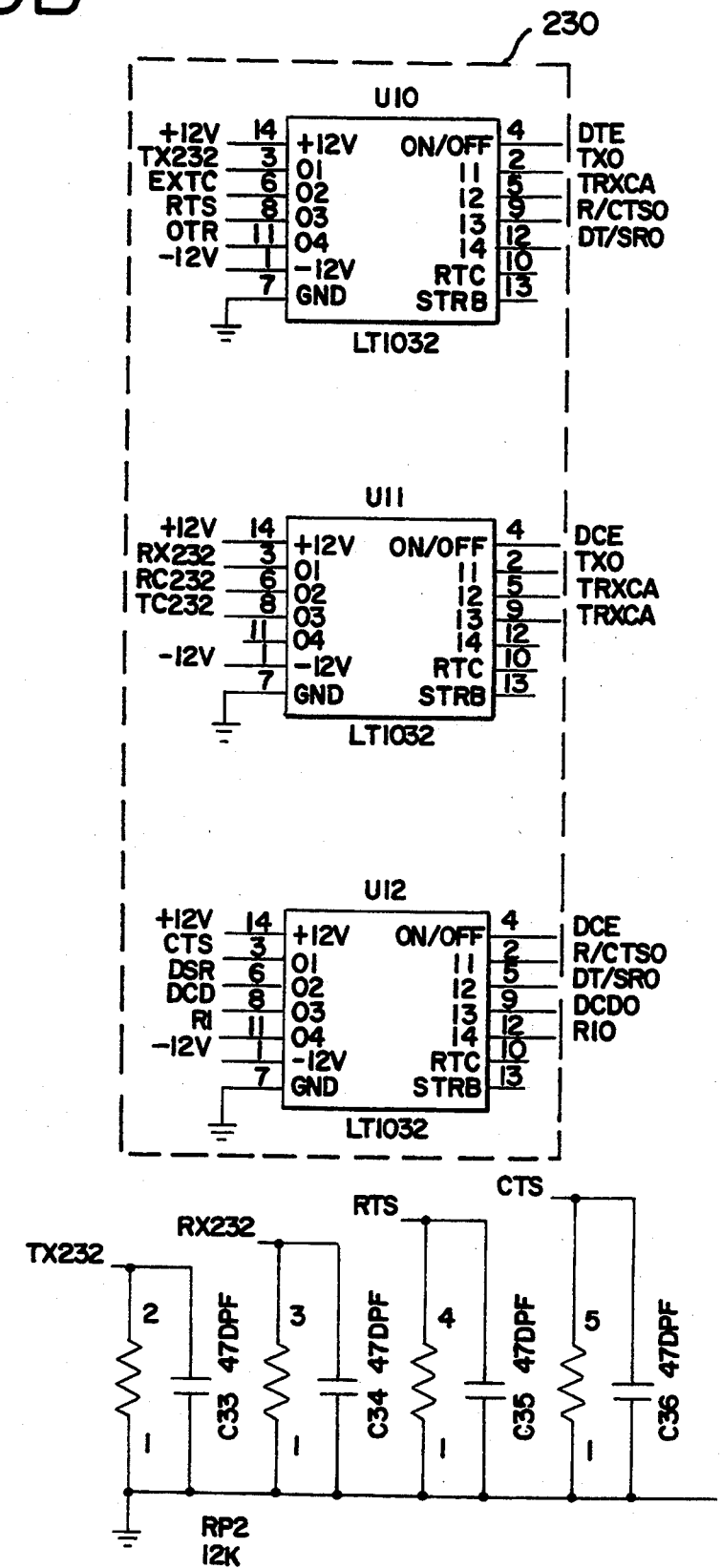
Figure 5C:
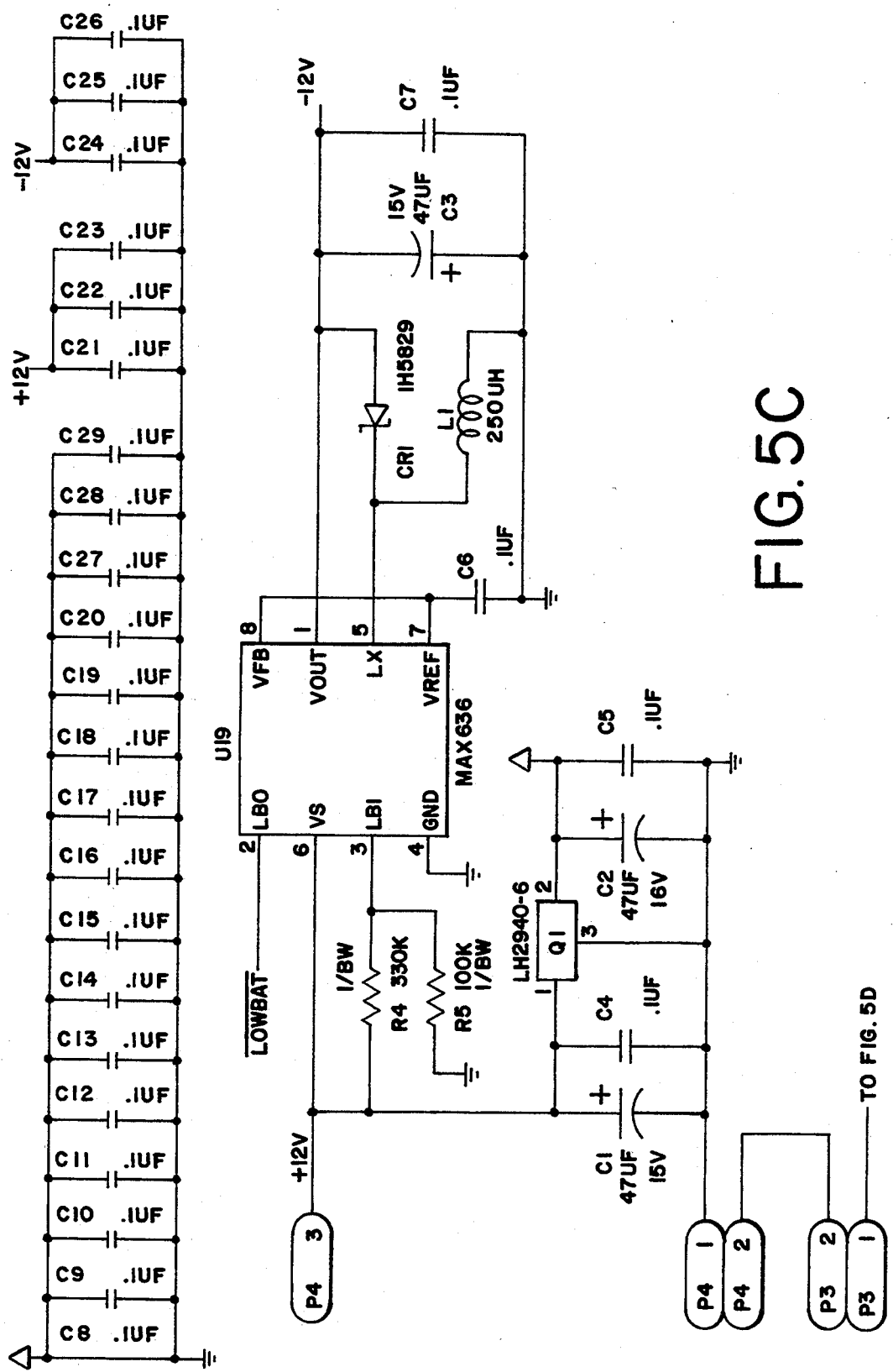
Figure 5D:
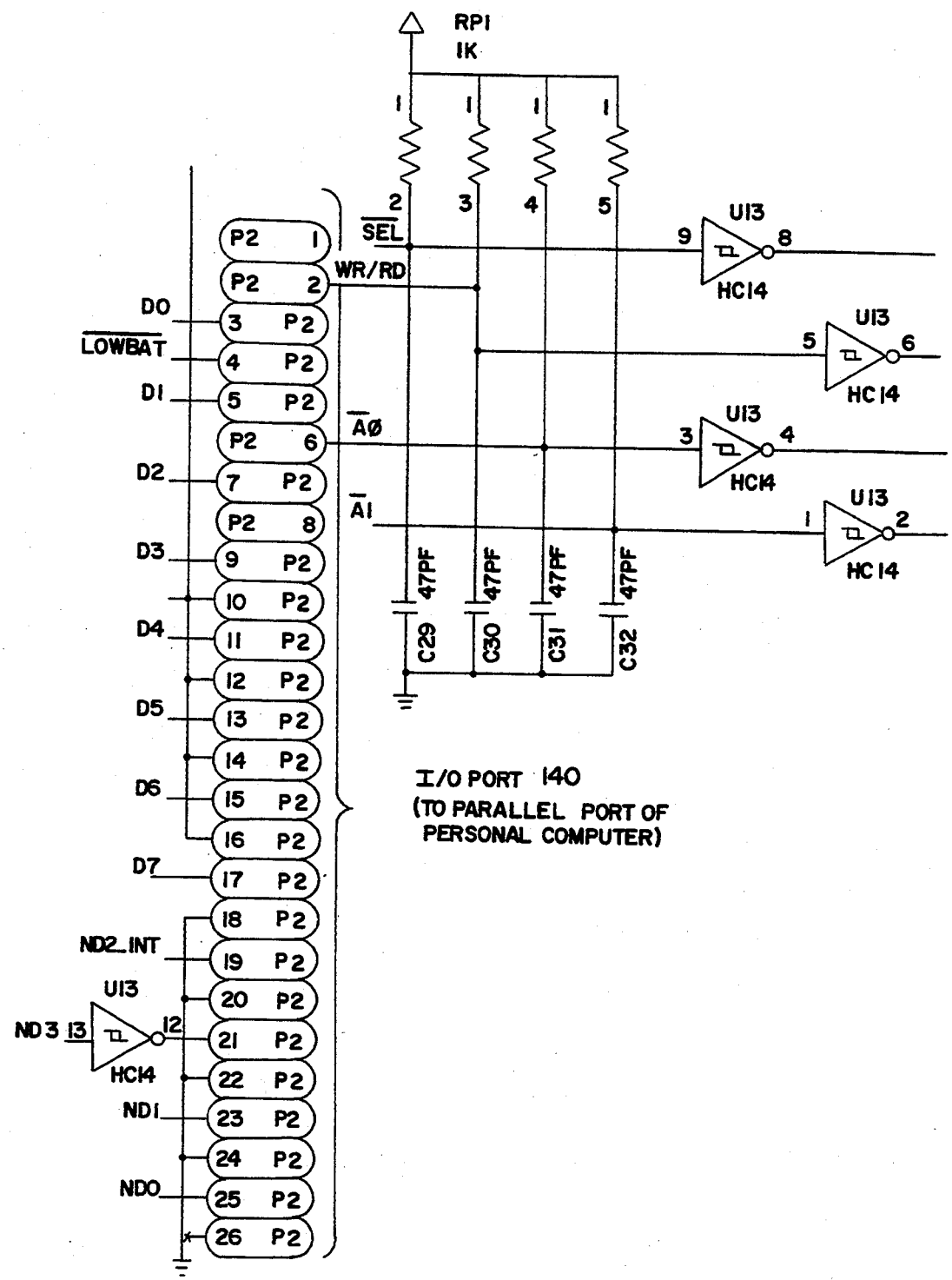
Figure 5E:
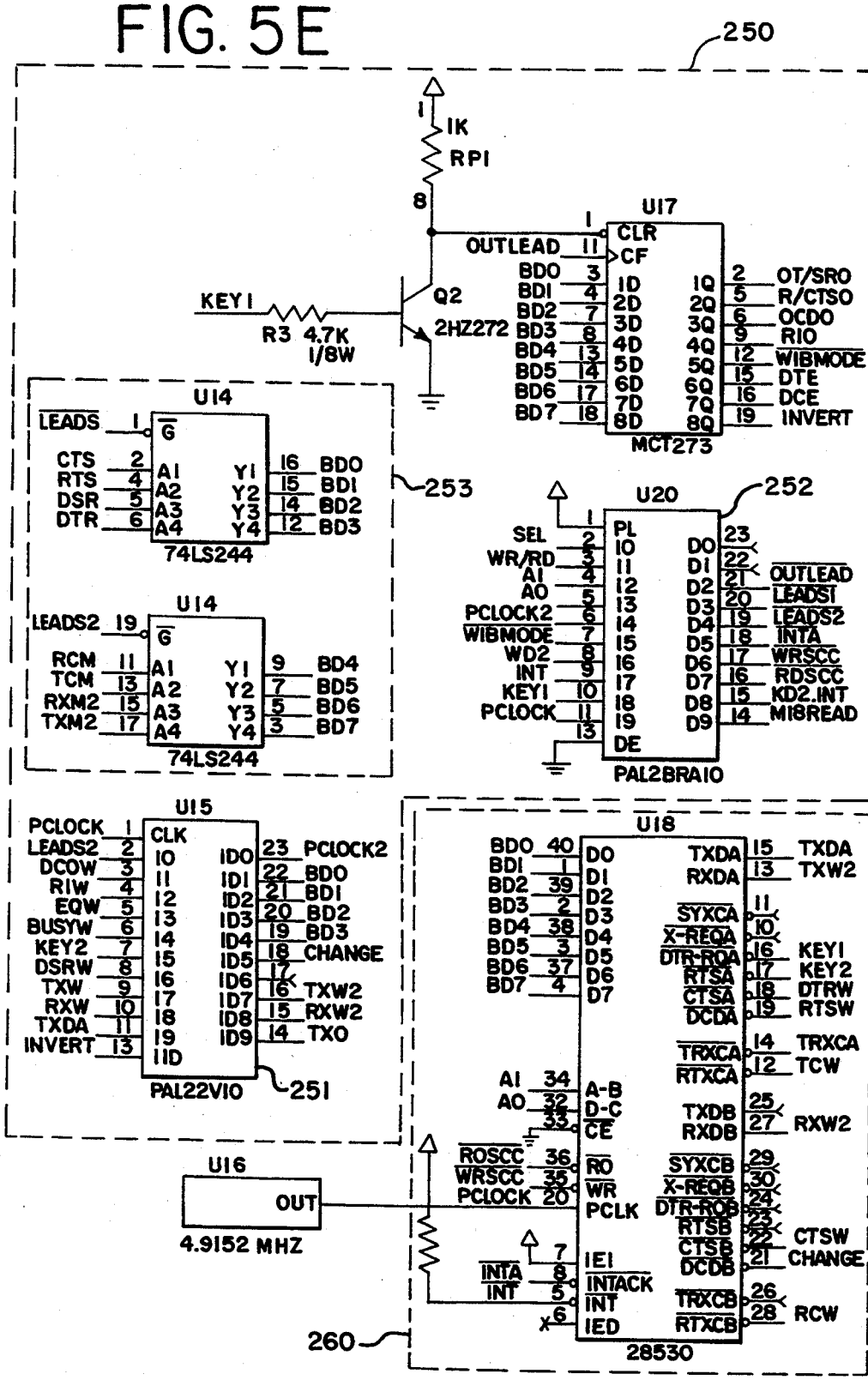
Figure 5F:
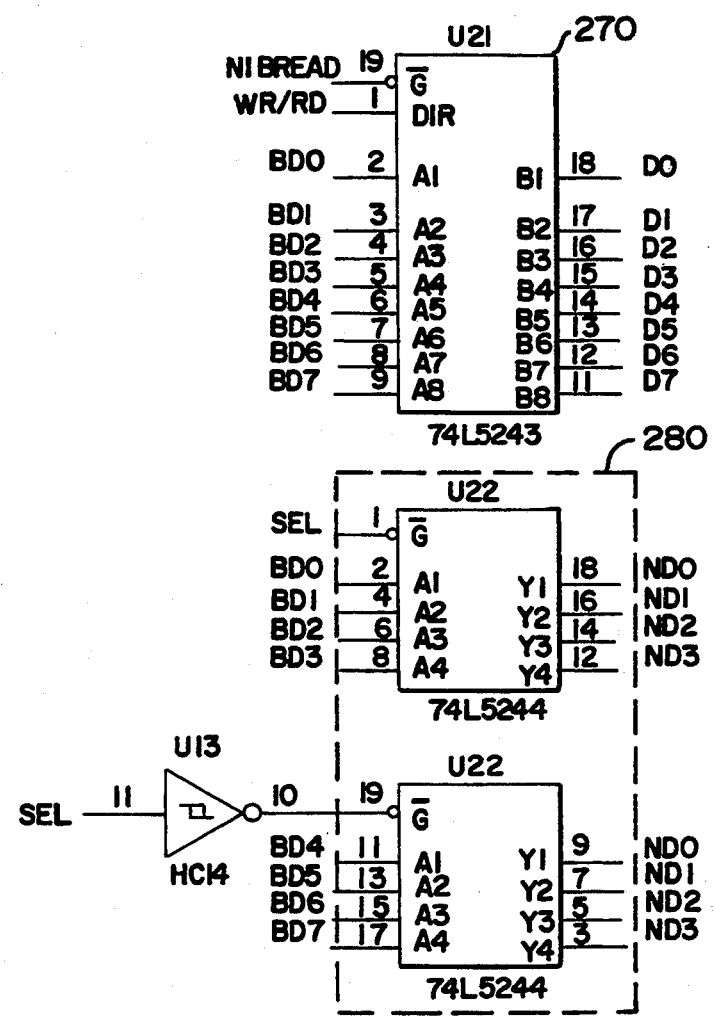
Figure 5G:
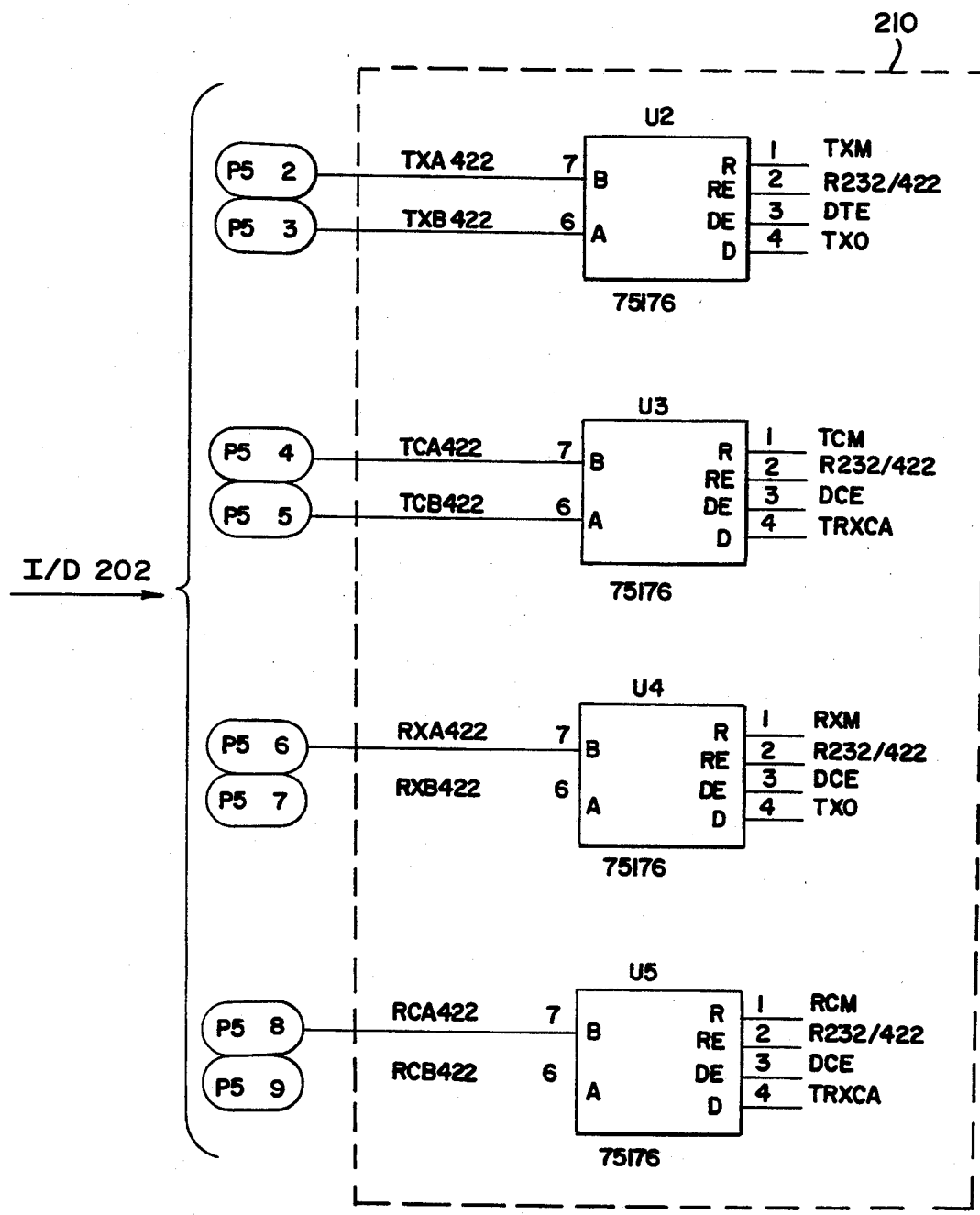

Before discussing the transmission of signals between the CIB and the parallel port of the personal computer for serial data analysis (which is identical for the first and second embodiment), we will discuss receiving and transmitting signals in the second embodiment. Turning then to the embodiment of FIGS. 4 and 5, the embodiment discloses a dual input port CIB allowing for input of different types of signals, such as RS-422 and RS-232. The embodiment of FIG. 4 shows a "T" connector 201 linking a DCE and a DTE to input port 101 of CIB 100. In this embodiment, input port 101 comprises a first input 202 and a second input 204. Input 202 preferably comprises a 9 pin connector and input 204 preferably comprises a 25 pin connector. The user has the option of choosing either of inputs 202 or 204 of input port 101 depending on whether RS-422 signals or RS-232 signals are to be analyzed.

Note that CIB 100 is not limited to two I/O ports for the DTE or DCE devices, nor are the signals limited to RS-422 or RS-232 signals. In one application, both I/O ports 202 and 204 could be used to transmit or receive signals. Specifically, CIB 100 may receive clock and data signals by way of I/O port 202 and modem signals by way of I/O port 204. In this embodiment, the input signals to 202 and 204 are serial data.

In the embodiments of FIGS. 4 and 5, the driver/receiver circuit 110 has components that are specific to both RS-232 and RS-422. This is reflected in FIG. 4, where driver/receiver circuit 110 comprises an RS-422 line driver/receiver 210 coupled to input 202, an RS-232 receiver circuit 220, and an RS-232 driver circuit 230, both of the latter two being coupled to the RS-232 input 204. If the user is analyzing RS-422 data, line driver/receiver 210 monitors input to the 9 pin I/O port 202. An example of a suitable RS-422 line driver/receiver would include a type SN 75176 bidirectional transceiver from Texas Instruments, which is a tri-state driver and receiver. If the user is analyzing RS-232 data, a single suitable RS-232 driver/receiver could be used. However, in the embodiment of FIG. 4, a separate driver circuit 230 and receiver circuit 220 is used. While the receiver circuit 220 is always active, the line driver 230 is active only some of the time for selectively transmitting signals. An example of a receiver component would be a LT 1039 RS-232 driver/receiver from Linear Technologies.

The transmission of signals received at the I/O port 101 in the DCE emulation mode or the DTE emulation mode from a DCE device or a DTE device will represent signals specific to either DTE or DCE device. However, beyond the driver/receiver circuit 110, which includes separate driver and receiver circuits for transmitting RS-232 and RS-422 signals, the transmission of RS-232 and RS-422 signals is achieved in the same manner. When RS-232 receiver 220 receives signals on data and clock inputs 221, receiver 220 outputs them on lines 257 and 266 to the USART and control circuit 120. Similarly, when RS-422 driver/receiver 210 receives signals on the data and clock lines input 211, the driver/receiver 210 outputs them on lines 255 and 265 to serial communication controller 120.

USART and control circuit 120 of FIG. 1 comprises a control circuit 250 and a USART 260 shown in FIG. 4. Generally speaking, each of these two components 250 and 260 are connected to components 210, 220 and 230 via lines 255, 256, 257, 265, 266, and 267 in embodiment of FIGS. 4 and 5. The outputs of RS-232 receiver circuit 220 are monitored by the control circuit 250 on lines 257 and by USART 260 at lines 266. Similarly, the outputs of RS-422 driver/receiver circuit are monitored by the control circuit 250 on lines 255 and by USART 260 on lines 265. The control circuit 250 monitors the lines 255 and 257 and detects changes in the inputs 202 and 204 to the I/O port 101 for the transmission of data when signals are received from the DTE or DCE in either the emulation mode or the monitor mode. Because the USART 260 is a dual channel device, it can monitor both the DTE and the DCE at the same time. When a change in the line is detected, the control circuit 250 exchanges signals with the USART 260 as well as the data bus BD0–BD7 for the transfer of signals to the personal computer. These signals can either represent data or status of the DCE or DTE or can be commands from the personal computer.

Specifically, the preferred embodiment of control circuit 250 includes two programmable array logic devices (PALs) 251 and 252 shown in FIG. 5. These PALs monitor outputs of the receiver circuits 210 and 220 on lines 255 and 257 for both RS-422 and RS-232 signals respectively. Depending on the mode of operation, the PALs will detect different signals. In monitor mode the PALs 251 and 252 take signals from the receivers 210 and 220 and present them to the bus 254 for eventual transfer to the personal computer via data bus transceiver 270 or control bus 280. In emulation mode the PALs 251 and 252 additionally send signals which emulate a function of the DTE or DCE. In the emulation mode, the PALs 251 and 252 detect the transmission of signals from the personal computer to a DTE or DCE or the receipt of return signals from a DTE or DCE. The PALs provide both data and control bus signals and signals which allow USART 260 to communicate effectively with various kinds of parallel ports of the computer, such as those which are bidirectional and those which are output only. The status of the DTE or DCE devices or any errors in transmission can be displayed on a monitor.

Another element of the serial communication controller 120 is the USART 260 in both the first embodiment shown in FIG. 2 and the second embodiment shown in FIG. 4, which functions as a serial-to-parallel and parallel-to-serial converter/controller. This function enables the CIB 100 not only to receive data from the DTE or DCE for processing in either emulation mode or monitor mode, but it also enables the CIB to operate in the emulation mode where signals are sent from the personal computer to the DTE or DCE via the USART 260. An example of a USART which could be used in CIB 100 is an Enhanced Serial Communication Controller (ESCC) from Zilog, Inc. This ESCC is a dual channel bi-directional device which can be software configured to satisfy a wide variety of serial communications applications. One significant feature is that the ESCC allows asynchronous and synchronous transfer of signals and data.

The control circuit 250 and the USART 260 in both the first and second embodiments interface with the parallel port 140 by way of data bus transceivers 270 and 280 of the Data/Control transceiver circuit 130. Therefore, the remaining description of the interface of the CIB and the personal computer applies to both the first and second embodiments. Specifically, both the control circuit 250 and the USART 260 transmit data and control signals on an eight-bit bus BD0–BD7. The data and control signals on bus BD0–BD7 are then transmitted to the parallel port of the personal computer on two buses. The data bus includes lines D0–D7 which are the outputs 273 of the data bus transceiver 270 corresponding to the inputs 272 from the bus BD0–BD7. An example is an octal bus transceiver such as a 74LS245 from Motorola, Inc. which allows eight line bidirectional data communication.

The second bus is the control ND0–ND3 bus which interfaces with I/O port 140 of the parallel port. The signals to bus ND0–ND3 are provided as outputs of two separate bus transceivers of the control transceiver circuit 280 which has inputs BD0–BD3 and BD4–BD7 respectively. Only one of the two transceivers is enabled at a time. An example of quad bus transmitter receiver is a 74LS244 from Motorola, Inc.

In interfacing CIB 100 with a personal computer, the software on the personal computer manipulates the control and data lines of the parallel port. Depending on the parallel port, the CIB may be accessed in the two ways. Some parallel ports are capable of reading the data lines while others are capable of only writing to the data lines. In a situation where the parallel port of the personal computer is capable of reading the data lines, a read transaction requires:

1) writing the transaction type (e.g. read) to control output lines 141, 2) reading a byte of 8 bits of information from the data lines, and 3) writing "end of transaction" to control output lines 141. In the situation where the parallel port data lines are the type which can write only, or if the user prefers to avoid changing the personal computer setup to accommodate a bidirectional port, the reading operation may be accomplished by using control output lines from the parallel port of the personal computer to select the transaction type, and using the control input lines to read four bits of information from the USART and/or registers. A five step read transaction includes:

1) writing the transaction type to control output lines 141, 2) reading 4 bits of information from 4 control input lines ND0–ND3, 3) writing a transaction type to control output lines 141, 4) reading the other 4 bits of information from 4 control input lines ND0–ND3, and 5) writing end of transaction to control output lines 141.

As described with reference to FIG. 1, the CIB 100 permits the bidirectional transmission of signals. Specifically, both the control and data transceivers 280 and 270, the USART 260, and the control circuit 250 allow bidirectional transmission of signals. Therefore, it is possible to send signals from the personal computer via the parallel port to either the DCE or DTE. In either case in which the parallel port is capable of reading/writing or writing only to the data lines, an efficient writing operation may be accomplished by using control output lines to select the transaction type (e.g. write to the CIB) and using the data lines to write 8 bits of information to the USART 260 and/or control circuit 250. A three step sequence optimizes transaction time. A write sequence requires:

1) writing 8 bits of information to the data lines BD0–BD7, 2) writing the transaction type to control output lines 141, and 3) writing end of transaction to control output lines 141.

Beyond the outputs to the bus BD0–BD7 of the data bus transceiver 270 and the control bus transceiver 280, the transmission of signals to either a DTE or a DCE from the personal computer is identical to transmitting signals to a personal computer from either the DTE or the DCE, because the driver/receiver chips are bidirectional. The only exception applies when transmitting RS-232 data to a DCE or DTE. In transmitting RS-232 data, a separate driver circuit 230 is used. An example of a driver circuit would be a quad bipolar low power line driver such as LT 1032 manufactured by Linear Technologies Corp. The inputs 267 and 256 to the line driver 230 include signals from the USART 260 and the control circuit 250. The outputs 231 of the RS-232 line driver 230 are connected to the I/O port 204. In driving RS-422 data, the same driver/receiver circuit is used to both transmit and receive data. An example of such a circuit is the 75176 differential bus transceiver provided by Texas Instruments, Inc. The outputs of the RS-422 driver/receiver circuit are connected to I/O port 202.

While this specification refers to specific devices, these references are not intended as limitation. Rather, the specification is intended to cover any substitutes which are well known in the art.

APPENDIX 1

Note: This appendix includes equations for the PALs of the control circuit 250 of the single input port CIB. The inputs and outputs of the PALs refer to those inputs and outputs shown in FIG. 3. In the following equations, a slash mark (/) indicates an inversion of the signal which follows and an asterisk (*) indicates a logical product.

| Equations for PAL1 251 of FIG. 3 | |
|---|---|
| TXO | = /TXDA*INVERT + TXDA*/INVERT |
| RXM2 | = /RXM*INVERT + RXM*/INVERT |
| TXM2 | = /TXM*INVERT + TXM*/INVERT |
| DCDM2 | := DO |
| CHANGE | = DCDM2*DCDM*/D1*/RIM*/DSRM |
| | + DCDM2*DCDM*D1*RIM*DSRM |
| | + /DCDM2*/DCDM*/D1*/RIM*DSRM |
| | + /DCDM2*/DCDM*D1*RIM*/DSRM |
| D3 | := BUSYM*/KEY2 + KEY2*VCC |
| D3.TRST | = /LEADS |
| D2 | := EQM*/KEY2 + KEY2*VCC |
| D2.TRST | = /LEADS |
| D1 | := RIM*/KEY2 + KEY2*GND |
| D1.TRST | = /LEADS |
| D0 | := DCDM*/KEY2 + KEY2*GND |
| D0.TRST | = /LEADS |
| PCLK2 | := /PCLK2 |
| Equations for PAL2 252 of FIG. 3 | |
| PCLK4 | := /PCLK4 |
| PCLK4.CLKF | = PCLK2 |
| C1 | := /A0*WRNOTRD*/SEL |
| C1.CLKF | = PCLK4 |
| OUTLEADS | := VCC |
| OUTLEADS.SETF | = /SEL*WRNOTRD*A1*A0*/C1* |
| | /PCLK*/PCLK4*/RDSCC*/WRSCC* |
| | /LEADS1*/LEADS2*/INTA*/KEY1 |
| OUTLEADS.RSTF | = /A0*WRNOTRD*/SEL |
| OUTLEADS.CLKF | = GND |
| LEADS1 | := VCC |
| LEADS1.SETF | = /SEL*/WRNOTRD*A1*/C1*/PCLK* |
| | /PCLK4*/RDSCC*/WRSCC* |
| | /LEADS2*/INTA*/OUTLEADS |
| LEADS1.RSTF | = /A0*WRNOTRD*/SEL |
| LEADS1.CLKF | = GND |
| LEADS2 | := VCC |
| LEADS2.SETF | = /SEL*/WRNOTRD*/A1*/A0*/C1* |
| | /PCLK*/PCLK4*/RDSCC*/WRSCC* |
| | /LEADS1*/INTA*/OUTLEADS |
| LEADS2.RSTF | = /A0*WRNOTRD*/SEL |
| LEADS2.CLKF | = GND |
| INTA | := VCC |
| INTA.SETF | = /SEL*/WRNOTRD*/A1*A0*/C1* |
| | /PCLK*/PCLK4*/RDSCC*/WRSCC* |
| | /LEADS1*/LEADS2*/OUTLEADS |
| INTA.RSTF | /A0*WRNOTRD*/SEL*/RDSCC |
| INTA.CLKF | = GND |
| WRSCC | := VCC |
| WRSCC.SETF | = SEL*WRNOTRD*/C1*/PCLK* |
| | /PCLK4*/RDSCC*/LEADS1* |
| | /LEADS2*/INTA*/OUTLEADS |
| WRSCC.RSTF | = /A0*WRNOTRD*/SEL |

```
-continued
WRSCC.CLKF    = GND
RDSCC         := INTA*/WRNOTRD + RDSCC
RDSCC.SETF    = SEL*/WRNOTRD*/C1*/PCLK*
                /PCLK4*/WRSCC*/LEADS1*
                /LEADS2*/INTA*/OUTLEADS
RDSCC.RSTF    = /A0*WRNOTRD*/SEL
RDSCC.CLKF    = PCLK2
ND2_INT       = WRNOTRD*/INT*PCLK4
                + NIBREAD*ND2*A0
                + NIBREAD*ND2*/LEADS1
                + INT*/A0*LEADS1
NIBREAD       = NIBMODE*/WRNOTRD
```

We claim:

1. A method of transmitting data between at least one external communication device and a serial data analyzer unit, the method comprising the steps of:
   receiving data from one or more external communication devices;
   processing said data received from said external communication devices;
   converting said data from serial to parallel form;
   connecting a parallel port of a personal computer to the serial data analyzer unit;
   adapting data lines and control data lines from the parallel port of the personal computer to transmit and receive data;
   selecting a read or write transaction in the serial data analyzer unit;
   selectively transmitting said data between at least one external communication device and the parallel port of the personal computer for serial data analysis;
   configuring control data lines to a desired type of transaction;
   transmitting bits of information from data lines between a universal synchronous/asynchronous receiver/transmitter (USART), capable of converging serial data of up to 8 bits, and a control circuit;
   writing 8 bits of information to the data lines for the write sequence;
   writing the desired type of transaction to control output lines for the write sequence; and
   writing end of transaction to control output lines for the write sequence.

2. A method of transmitting data between at least one external communication device and a serial data analyzer unit, the method comprising the steps of:
   receiving data from one or more external communication devices;
   processing said data received from said external communication devices;
   converting said data from serial to parallel form;
   connecting a parallel port of a personal computer to the serial data analyzer unit;
   adapting data lines and control data lines from the parallel port of the personal computer to transmit and receive data;
   selecting a read or write transaction in the serial data analyzer unit;
   selectively transmitting said data between at least one external communication device and the parallel port of the personal computer for serial data analysis;
   configuring control data lines to a desired type of transaction;
   transmitting bits of information from data lines between a universal synchronous/asynchronous receiver/transmitter (USART), capable of converting serial data of up to 8 bits, and a control circuit;
   writing the desired type of transaction to control output lines for the read sequence;
   reading 8 bits of information from the data lines for the read sequence; and
   writing end of transaction to control output lines for the read sequence.

3. A method of transmitting data between at least one external communication device and a serial data analyzer unit, the method comprising the steps of:
   receiving data from one or more external communication devices;
   processing said data received from said external communication devices;
   converting said data from serial to parallel form;
   connecting a parallel port of a personal computer to the serial data analyzer unit;
   adapting data lines and control data lines from the parallel port of the personal computer to transmit and receive data;
   selecting a read or write transaction in the serial data analyzer unit;
   selectively transmitting said data between at least one external communication device and the parallel port of the personal computer for serial data analysis;
   configuring control data lines to a desired type of transaction;
   transmitting bits of information from data lines between a universal synchronous/asynchronous receiver/transmitter (USART), capable of converting serial data of up to 8 bits, and the control circuit;
   writing 8 bits of information to the data lines in the write sequence;
   writing the desired type of transaction to control output lines in the write sequence;
   writing end of transaction to control output lines in the write sequence;
   writing the desired type of transaction to the control output lines to the parallel port of the personal computer;
   reading 4 bits of information from one or more of the control input lines from the parallel port of the personal computer;
   writing the transaction type to the control output lines to the parallel port of the personal computer;
   reading 4 bits of information from the control input lines from the parallel port of the personal computer; and
   writing end of transaction to the control output lines.

* * * * *